(12) United States Patent
Kurani (10) Patent No.: US 12,154,157 B1
(45) Date of Patent: Nov. 26, 2024

(54) SYSTEMS AND METHODS FOR PROVIDING INTELLIGENT ELECTRONIC COMMUNICATIONS

(71) Applicant: Wells Fargo Bank, N.A., San Francisco, CA (US)

(72) Inventor: Ashish B. Kurani, Hillsborough, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 342 days.

(21) Appl. No.: 17/122,297

(22) Filed: Dec. 15, 2020

Related U.S. Application Data

(63) Continuation of application No. 15/363,343, filed on Nov. 29, 2016, now Pat. No. 10,872,369.

(60) Provisional application No. 62/271,802, filed on Dec. 28, 2015.

(51) Int. Cl.
*G06Q 30/00* (2023.01)
*G06Q 30/0601* (2023.01)

(52) U.S. Cl.
CPC .............................. *G06Q 30/0631* (2013.01)

(58) Field of Classification Search
CPC ................................................ G06Q 30/0631
USPC ......................................................... 705/26.7
See application file for complete search history.

(56) References Cited

U.S. PATENT DOCUMENTS

| | | | |
|---|---|---|---|
| 7,706,785 B2 | 4/2010 | Lei et al. | |
| 8,219,491 B2 | 7/2012 | Peace et al. | |
| 8,384,549 B2 | 2/2013 | Lemmon | |
| 8,487,758 B2 | 7/2013 | Istoc | |
| 8,732,101 B1 * | 5/2014 | Wilson | G06Q 30/0269 706/15 |
| 8,823,507 B1 | 9/2014 | Touloumtzis | |
| 10,163,129 B1 | 12/2018 | Agarwal et al. | |

(Continued)

FOREIGN PATENT DOCUMENTS

| | | | | |
|---|---|---|---|---|
| KR | 2009003048 A * | 1/2009 | ............ | G06Q 30/02 |
| WO | WO-0233628 A2 * | 4/2002 | ............ | G06Q 30/02 |
| WO | WO-2014/131038 A1 | 8/2014 | | |

OTHER PUBLICATIONS

Jan. 31, 2023, 10:48 AM k-means clustering—Wikipedia.*

*Primary Examiner* — Russell S Glass
(74) *Attorney, Agent, or Firm* — Foley & Lardner LLP (57) ABSTRACT

A method for providing an intelligent electronic communication to a consumer device using a recommendation engine. The method includes accessing consumer data, determining an adverse account event based on the consumer data, based on determining the adverse account event, generating, by a clustering process, a consumer group defined by a common characteristic of consumer activity, correlating the consumer account to the consumer group based, at least in part, on the consumer data corresponding to the consumer group, generating an intelligent electronic communication comprising one or more ranked product recommendations based, at least in part, on the consumer group, the one or more ranked product recommendations configured to include one or more unutilized product recommendations, determining an intelligent delivery mode to provide the intelligent electronic communication to the consumer device, and causing the intelligent electronic communication to be distributed to the consumer device in accordance with the intelligent delivery mode.

20 Claims, 5 Drawing Sheets

(56) References Cited

U.S. PATENT DOCUMENTS

| | | | | |
|---|---|---|---|---|
| 10,872,369 | B1* | 12/2020 | Kurani | G06Q 30/0631 |
| 2007/0073748 | A1* | 3/2007 | Barney | G06F 16/2228 |
| | | | | 707/E17.093 |
| 2010/0042445 | A1 | 2/2010 | Nicosia | |
| 2011/0153744 | A1 | 6/2011 | Brown | |
| 2013/0237287 | A1 | 9/2013 | Ferren et al. | |
| 2014/0046830 | A1 | 2/2014 | Orozco et al. | |
| 2014/0068710 | A1 | 3/2014 | Lau et al. | |
| 2014/0096035 | A1* | 4/2014 | Hall | G06F 3/01 |
| | | | | 715/753 |
| 2014/0129371 | A1* | 5/2014 | Wilson | G06Q 30/0631 |
| | | | | 705/26.7 |
| 2014/0279196 | A1* | 9/2014 | Wilson | G06Q 30/0631 |
| | | | | 705/26.7 |
| 2014/0304155 | A9 | 10/2014 | Wilkes | |
| 2015/0220836 | A1* | 8/2015 | Wilson | G06Q 30/0269 |
| | | | | 706/46 |

* cited by examiner

SYSTEMS AND METHODS FOR PROVIDING INTELLIGENT ELECTRONIC COMMUNICATIONS

CROSS-REFERENCE TO RELATED PATENT APPLICATIONS

This application is a Continuation of U.S. application Ser. No. 15/363,343, filed Nov. 29, 2016, which claims priority to U.S. Provisional Application No. 62/271,802, filed Dec. 28, 2015, both of which are incorporated herein by reference in their entireties.

TECHNICAL FIELD

Embodiments of the present invention relate generally to notifications. In particular, the embodiments of the present invention relate to systems and methods for providing electronic communications.

BACKGROUND

The advent of consumer devices configured to send and receive electronic communications has revolutionized the modes by which consumers communicate, perform transactions, or otherwise receive communications. In the past, consumers would typically receive communications via physical media (e.g., physical statements, notices, mail transported via a postal delivery service, etc.) to alert consumers as to the state of an account (e.g., a consumer financial account). However, the digital age has provided a wealth of new modes that may be used to optimize the consumer's ability to receive communications electronically. As a result, new technologies have been developed to facilitate communication to consumer devices.

Unlike conventional communication techniques related to the receipt of paper or other physical media, various apparatuses offer a wealth of additional electronic solutions to improve the experience for consumers. The ability to receive communications electronically via a consumer device provides consumers with the ability to remain connected to consumer, personal, or social frameworks. Although the ability to receive communications electronically provides a convenient way to receive information, the inventors have determined that existing solutions may not always efficiently leverage this mode of communication and, consequently, have identified various problems and difficulties that occur in providing electronic communications.

SUMMARY

One embodiment relates to a method for providing an intelligent electronic communication to a consumer device using a recommendation engine. The method includes accessing consumer data, determining an adverse account event regarding the consumer account based on the consumer data, based on determining the adverse account event, generating, by a clustering process, a consumer group defined by a common characteristic of consumer activity, correlating the consumer account to the consumer group based, at least in part, on the consumer data corresponding to the consumer group, generating an intelligent electronic communication comprising one or more ranked product recommendations based, at least in part, on the consumer group, the one or more ranked product recommendations configured to include one or more unutilized product recommendations, determining an intelligent delivery mode to provide the intelligent electronic communication to the consumer device, and causing the intelligent electronic communication to be distributed to the consumer device in accordance with the intelligent delivery mode.

Another embodiment relates to a computer system configured to provide an intelligent electronic communication to a consumer device. The computer a network interface structured to facilitate data communication with the consumer device via a network, a memory, and a processor. The processor is structured to access consumer data regarding a consumer account, determine an adverse account event regarding the consumer account based on the consumer data, based on determining the adverse account event, generate, by a clustering process, a consumer group defined by a common characteristic of consumer activity, correlate the consumer account to the consumer group based, at least in part, on the consumer data corresponding to the consumer group, generate an intelligent electronic communication comprising one or more ranked product recommendations based, at least in part, on the consumer group, the one or more ranked product recommendations configured to include one or more unutilized product recommendations, determine an intelligent delivery mode to provide the intelligent electronic communication to the consumer device, and cause the intelligent electronic communication to be distributed to the consumer device in accordance with the intelligent delivery mode.

Another embodiment relates to a computer program product including a non-transitory computer readable storage medium storing instructions that, when executed by a processor, cause the processor to access consumer data regarding a consumer account, determine an adverse account event regarding the consumer account based on the consumer data, based on determining the adverse account event, generate, by a clustering process, a consumer group defined by a common characteristic of consumer activity, correlate the consumer account to the consumer group based, at least in part, on the consumer data corresponding to the consumer group, generate an intelligent electronic communication comprising one or more ranked product recommendations based, at least in part, on the consumer group, the one or more ranked product recommendations configured to include one or more unutilized product recommendations, determine an intelligent delivery mode and delivery period to provide the intelligent electronic communication to a consumer device, and cause the intelligent electronic communication to be distributed to the consumer device in accordance with the intelligent delivery mode.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Referring to the Figures generally, systems, apparatuses, and methods for providing intelligent electronic communications are described herein. According to the present disclosure, a financial institution may facilitate the provision of an intelligent electronic communication (e.g., an electronic alert, message, or notification logically configured to provide one or more ranked product recommendations) to a consumer device (e.g., a mobile phone, wearable, tablet, laptop, etc.). The intelligent electronic communication may be provided in response to an adverse account event. The intelligent electronic communication may be structured to include one or more product recommendations to resolve, or otherwise address, an adverse account event (e.g., missed credit card payments, missed mortgage payments, defaults on loans, missed insurance premium payments, account overdrafts, account balances below a specified value, failure to pay finance charges and/or fees, etc.). In turn, the financial institution may cause the intelligent electronic communication to be distributed to a consumer device according to an intelligent delivery mode (e.g., a delivery mode executed based on a logical determination of when and/or how to provide the intelligent electronic communication). The intelligent delivery mode may include at least one of a delivery location, a delivery period, or an electronic communication type such as an e-mail, text message, in-app message, application alert, alert comprising streaming data, voice or audible alert, or other mode of distributing electronic communications).

Figure 1:
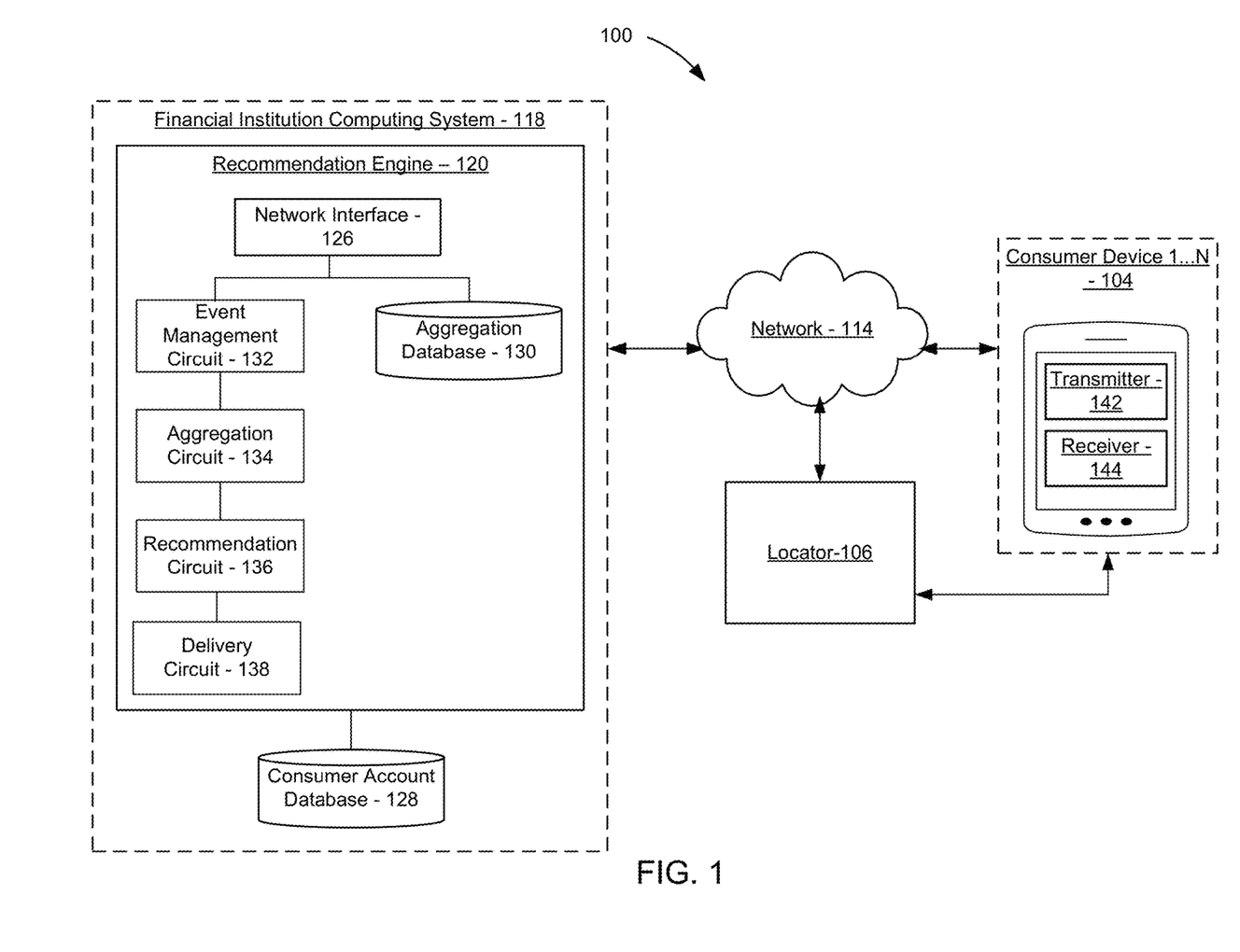
FIG. 1 is a diagram of a computing system according to an example embodiment.

Referring to FIG. 1, a diagram of a computing system 100 is illustrated according to an example embodiment. As shown, the computing system 100 includes a financial institution computing system 118, recommendation engine 120, network interface 126, consumer database 128, aggregation database 130, event management circuit 132, aggregation circuit 134, recommendation circuit 136, delivery circuit 138, network 114, locator 106, consumer device 104, transmitter 142, and receiver 144. As described in further detail below, the computing system 100 facilitates the provision of an intelligent electronic communication to a consumer device 104. As used herein, the term "consumer device" should be understood to refer to a mobile phone, wearable (e.g., a smartwatch, smart eyewear, etc.), tablet, laptop, personal digital assistant, or any other device configured for communication with the financial institution computing system 118 via a network (e.g., the network 114).

As depicted, the financial institution computing system 118 includes the recommendation engine 120. The recommendation engine 120 includes the network interface 126. The network interface 126 facilitates the sending and receiving of data over the network 114 (e.g., to and from the consumer device 104). As used herein, the term "network" should be understood to refer to a local area network, wide area network, personal area network, an Internet or Bluetooth® supported network, Z-Wave, ZigBee, Wireless USB, or other wireless and wired network, mobile network, or other communications network.

The recommendation engine 120 also includes an aggregation database 130 that may be structured to store data relating to a consumer group, such as data aggregated or otherwise corresponding to a plurality of consumer accounts as provided via the consumer account database 128. The provision of the intelligent electronic communication via the recommendation engine 120 is described in further detail below.

The recommendation engine 120 further includes an event management circuit 132, an aggregation circuit 134, a recommendation circuit 136, and a delivery circuit 138 as described herein below. In the embodiment shown, the event management circuit 132 may be communicably and operatively coupled to the aggregation circuit 134, which is communicably and operatively coupled to the recommendation circuit 136, which is communicably and operatively coupled to the delivery circuit 138. In other embodiments, each circuit 132-138 may be communicably and operatively coupled to each other circuit 132-138.

In further embodiments, the recommendation engine 120 may be communicably and operatively coupled to a consumer account database 128 that may be structured to store consumer information and account information relating to accounts held with the financial institution computing system 118.

The event management circuit 132 may be structured to access the consumer account database 128 to receive consumer data. As used herein, the term "consumer data" may include a data set comprising data specific to a particular consumer account. The data set may include at least one of a consumer account balance, consumer asset data, consumer liability data, consumer profile data such as age, gender, education level etc. In some embodiments, consumer data may include a data set comprising an aggregated population of data associated with at least a portion of consumers. Alternatively or additionally, the consumer data may be accessed via memory. As described herein below, the event management circuit 132 may utilize a processor to perform the actions described herein.

In some embodiments, the event management circuit 132 may be structured to determine an adverse account event (e.g., missed credit card payments, missed mortgage payments, defaults on loans, missed insurance premium payments, account overdrafts, account balances below a specified value, etc.) based, at least in part, on the accessed consumer data. For example, the event management circuit 132 may determine the consumer data corresponding to a particular consumer account includes data indicative of an adverse account event, such as for example, the non-payment of a credit card account.

In turn, the event management circuit 132 may be structured to correlate a consumer account to a consumer group (e.g., a cohort or other group of consumers, users, identified individuals, or entities sharing common characteristics of consumer activity or attributes) based, at least in part, on the consumer data corresponding to the consumer account (e.g., an individual or particular consumer account). Alternatively or additionally, the event management circuit 132 may be structured to correlate the consumer account to a consumer group based, at least in part, on the consumer data corresponding to the consumer group. The event management circuit 132 may be structured to receive the consumer data via the aggregation circuit 134. In this regard, the consumer group may be defined by common characteristics of consumer activity (e.g., products utilized, adverse account events, or actions otherwise taken, by consumers in response to an adverse account event). The common characteristics of consumer activity may be clustered by aggregating characteristics and behaviors associated with various consumer accounts. Characteristics can include adverse account events, such as for example, missed credit card payments, missed mortgage payments, defaults on loans, etc. Characteristics can further include data relating to consumer account balances, consumer assets, consumer liabilities, consumer profiles such as age, gender, education level, income, etc.

In some embodiments, the recommendation engine 120 includes the recommendation circuit 136. The recommendation circuit 136 may be structured to generate an intelligent electronic communication comprising one or more ranked product recommendations. A product recommendation may include financial solutions which may be recommended by a financial advisor, financial professional, etc., to resolve adverse account events. The ranked product recommendations provide recommended products to a consumer according to products utilized by consumers similarly-situated to the consumer to whom the recommendation is being made. The one or more ranked product recommendations may be based, at least in part, on at least one of the adverse account event (e.g., an account overdraft such as a $500 overdraft) or the consumer group (e.g., the cohort sharing common characteristics of consumer activity). For example, a product recommendation may be to transfer $3000 from a line of credit in response to the adverse account event of the $500 overdraft. This course of action may be recommended because the clustered consumer activity patterns of like consumers who have experienced an account overdraft indicate that transferring additional money may be desirable to the consumer and may prevent subsequent overdrafts from re-occurring. Further, as indicated by the clustered consumer activity patterns, the prediction may be that like other consumers showing this consumer activity patter this particular consumer may prefer to implement a "quick solution" to the $500 overdraft by transferring $3000 in real-time or near real-time before proceeding with a course of action that may involve more procedural requirements and/or time (e.g., transferring money from another bank, taking money out of a money market investment, etc.).

In other example embodiments, a product recommendation may be to transfer $1000 from an investment portfolio. Yet, in other example embodiments, a product recommendation may be transfer $1000 from a brokerage account. To that end, the recommendation circuit 136 may generate an intelligent electronic communication comprising each of the respective product recommendations ranked accordingly.

In some embodiments, the generation of the intelligent electronic communication comprising the one or more ranked product recommendations may include determining one or more product recommendations, for example one or more unutilized product recommendations and/or one or more utilized product recommendations, to provide to the consumer via the consumer device 104. The unutilized product recommendations may include products not previously associated with a consumer account which may be recommended to the consumer. The utilized product recommendations may include products currently or previously associated with a consumer account which may be recommended to the consumer. To that end, the recommendation circuit 136 may be structured to determine one or more products (e.g., utilized products and/or unutilized products) corresponding to a particular consumer account.

Alternatively or additionally, the recommendation circuit 136 may be structured to determine one or more products corresponding to the consumer group. In this regard, the recommendation engine 136 is structured to determine one or more products utilized by an aggregation of individual consumers associated with the consumer group in response to the occurrence of an adverse account event as indicated by each representative consumer activity pattern. The one or more products determined may then be ranked as described herein with reference to FIGS. 2 and 5. In further embodiments, the recommendation circuit 136 may be structured to generate an intelligent electronic communication comprising one or more ranked product recommendations responsive to the determination of the one or more products corresponding to the consumer group.

In other example embodiments, the indication of consumer activity may be based on a determined typical response from the consumer group in response to like transactions (e.g., adverse account events). In another example embodiment, the indication of consumer activity may be based on a predicted response of one or more consumers corresponding to the consumer group in response to like transactions.

In some embodiments, the recommendation engine 120 includes the delivery circuit 138. The delivery circuit 138 may be structured to cause the intelligent electronic communication to be distributed to a consumer device 104 according to an intelligent delivery mode (e.g., a delivery mode executed based on a logical determination of when and/or how to provide the intelligent electronic communication). The delivery circuit 138 may be structured to receive the intelligent electronic communication via the recommendation circuit 136 and/or memory. The intelligent delivery mode may comprise at least one of a delivery location, a delivery period, or an electronic communication type such as an e-mail, text message, in-app message, application alert, voice or audible alert, or other mode of distributing electronic communications as described herein with reference to FIG. 2.

The financial institution computing system 120 maintains each respective consumer account that includes a respective profile comprising consumer preference criteria (e.g., data indicative of a preferred time, location, etc. that a consumer prefers to receive intelligent electronic communications). In some embodiments, the consumer preference criteria may be accessed by the delivery circuit 138 to determine whether to provide the intelligent electronic communication to the consumer. The intelligent electronic communications may be stored in memory via data structures such as a queue, stack, or other storage until the delivery circuit 138 may provide the intelligent electronic communication to the consumer device according to the consumer preference criteria (e.g., between the hours of 12PM to 3PM, at a preferred restaurant in Chicago, IL, etc.).

In further embodiments, the delivery circuit 138 may be structured to determine whether to provide the intelligent electronic communication to the consumer according to the consumer group (e.g., the cohort sharing common characteristics of consumer activity) correlated to the consumer account. The common characteristics of consumer activity (e.g., the common consumer response metrics such as data associated with time, location, etc., indicative of the receipt of consumer activity responsive to an intelligent electronic communication) as determined by clustering process (e.g., k-means clustering) process may be combined with delivery data (e.g., the consumer's current location) to determine whether to provide the intelligent electronic communication to the consumer. In some embodiments, the one or more consumer response metrics may be derived from one or more time identifiers (e.g., one or more clocks) associated with the financial institution computing system 118 and/or the consumer device 104. The one or more consumer response metrics may be provided, via the consumer account database 128, the aggregation database 130, and/or memory, to the delivery circuit 138.

Based on the common characteristics of consumer activity (e.g., previous transaction data indicative of consumer responses at a particular location and/or time) associated with other like consumers, the delivery circuit 138 may further determine that other consumers in like consumer groups typically respond to alerts received according to at least one of a delivery location or delivery period. For example, the delivery circuit 138 may determine (based on location information provided by the consumer device) that the consumer is currently at "Coffee Shop X" and that the current time is 10:00 AM. Based on consumer data (e.g., transaction data associated with other like consumers), the delivery circuit 138 may further determine that other consumers in the same consumer group (e.g., cohort) typically respond to alerts received at the delivery location "Coffee Shop X" and at the delivery period "10:00 AM."

To that end, the delivery circuit 138 may be structured to cause an intelligent electronic communication to be distributed to a consumer device corresponding to a delivery location. The delivery location may be provided, via the locator 106 and/or the network 114, to the delivery circuit 138. The locator 106 may include a system configured for multilateration, global positioning system (GPS), and/or other locating system configured to obtain the position of a consumer device (e.g., the consumer device 104) and, in some embodiments, a consumer associated with the consumer device. The consumer device (e.g., the consumer device 104) may include a transmitter 142 and/or a receiver 144. In some example embodiments, the consumer device may include a transceiver (not shown) configured to operate as a transmitter and receiver. The transmitter 142 and the receiver 144 may be operable to, respectively, send and/or receive signals (e.g., signal data corresponding to an air interface standard associated with a communication system (e.g., cellular system), speech data, received data, etc.) via a processor.

In further embodiments, the receiver 144 may be structured to receive signals provided by a satellite or other locating system (e.g., a GPS). In this regard, the delivery circuit 138 may determine the consumer device location. In turn, the delivery circuit 138 may be structured to cause the intelligent electronic communication to be distributed to the consumer device 104 at the delivery location. The intelligent electronic communication may include a message that communicates "other consumers like you selected one of the following product recommendations in response to a late payment."

Figure 2:
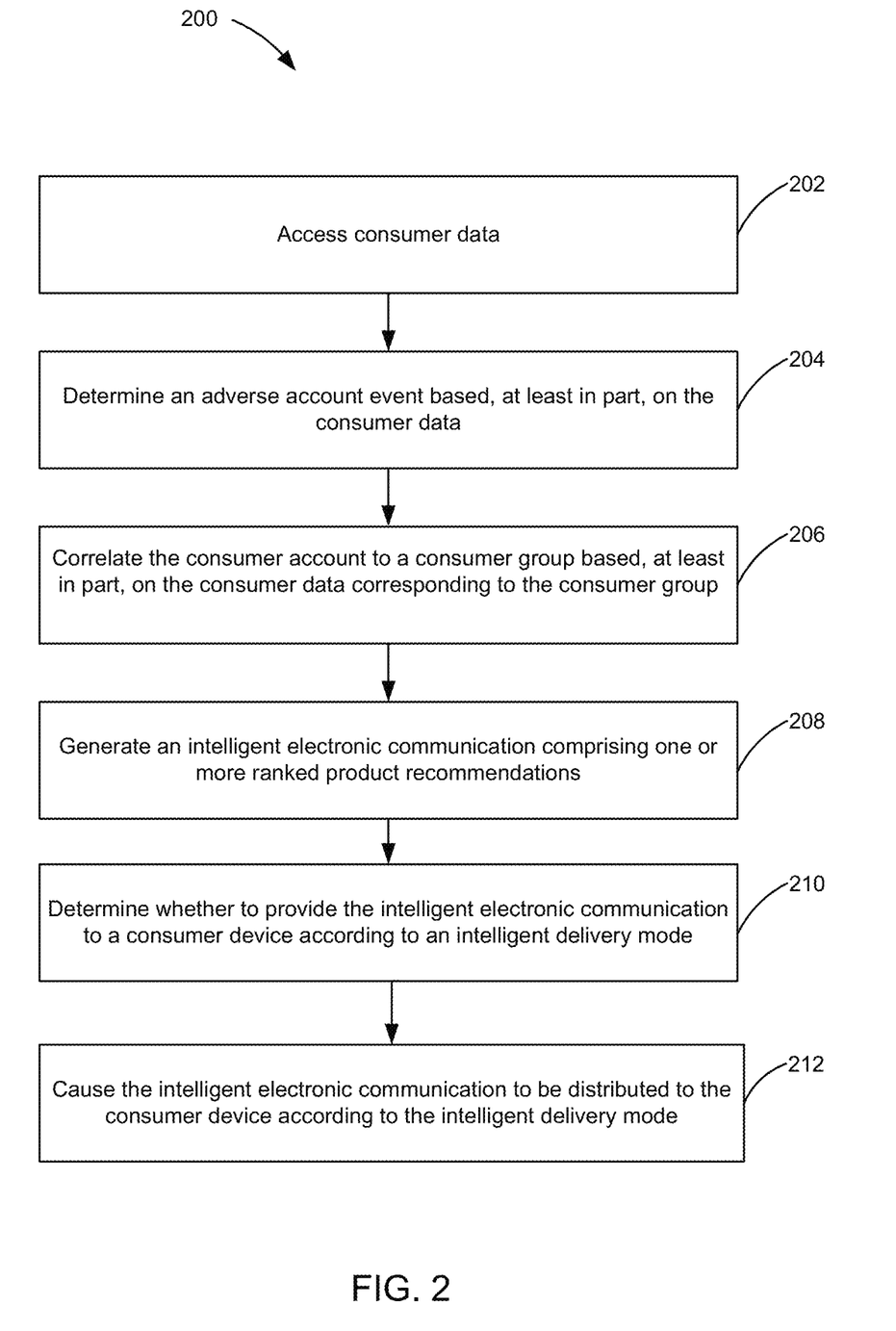
FIG. 2 is a flow diagram of a method of providing an intelligent electronic communication to a consumer device according to an example embodiment.

With reference to FIG. 2, a flow diagram of a method 200 of providing an intelligent electronic communication to a consumer device is shown according to an example embodiment. Method 200 may be performed by the recommendation engine 120 (e.g., by the processor 122), such that reference may be made to the recommendation engine 120 to help explain the features, processes, and aspects of method 200. The method 200 begins when consumer data corresponding to a consumer account is accessed at 202. The financial institution computing system 118 is structured to access consumer data (e.g., information associated with each respective consumer or account holder) of the financial institution computing system 118. Accordingly, the recommendation engine 120 may be structured to gather consumer data relating to consumers associated with the financial institution computing system 118. For example, the financial institution computing system 118 maintains a consumer account (e.g., an account comprising a profile of the consumer). The recommendation engine 120 may be structured to access memory and/or the consumer account database 128 to receive the consumer data associated with each respective consumer.

In further embodiments, the recommendation engine 120 may be structured to determine an adverse account event based, at least in part, on the consumer data at 204. The adverse account event may comprise consumer data that indicates a bounced check written by the consumer, or other transaction that causes a consumer account to be overdrawn or fall below a minimum balance requirement, a late payment on a line of credit, etc.

The recommendation engine 120 may be structured to correlate a consumer account to a consumer group based, at least in part, on the consumer data corresponding to the consumer group at 206. In some embodiments, the consumer account may be correlated to a consumer group based, at least in part, on the consumer data (e.g., the account balance, such as a positive account balance or a negative account balance) corresponding to a consumer account. For example, the consumer account may be correlated to a consumer group according to common characteristics of consumer activity (e.g., products utilized, adverse account events, or actions otherwise taken, by consumers in response to an adverse account event).

In some embodiments, the common characteristics may be clustered by generating a plurality of consumer activity patterns associated with particular consumers over a relevant time period. Various algorithms exist for performing cluster analysis. For example, consumer activity patterns may be generated via a SAX (symbolic aggregate approximation) process. As used herein, the term "SAX process" may be used to refer to a data processing procedure by which a set of time-series data is converted into a string of symbolic characters. Each respective character may designate an increment of some value (e.g., an increment of consumer activity) at a given time interval. The SAX process may include the identification of a plurality of patterns of consumer activity changes from the consumer data set. In further embodiments, the consumer activity patterns generated, via the SAX process, may be clustered. Accordingly, the aggregation circuit 134 may be structured to cluster, via a KMC (k-means clustering) process, the consumer activity patterns into representative patterns. As used herein, the term "KMC process" may include the identification of a plurality of patterns of consumer activity changes provided via the consumer data. In some embodiments, the common characteristics are clustered by collecting individual types of characteristics (e.g., missed credit card payments and the products utilized in response to the missed credit card payments, defaults on loans and the products utilized in response to the default, missed insurance premium payments and the products utilized in response to the missed payments, etc.) that are consistent among the consumers showing adverse account events over the relevant time period. In this regard, individual characteristics and consumer activity patterns may be clustered into various consumer groups. A maximum level of data variance may be applied such that each cluster of behaviors or characteristics meet some minimum level of similarity.

In some embodiments, the common characteristics may be clustered by generating, via the SAX process, the plurality of consumer activity patterns associated with particular consumers over a relevant time period. Accordingly, the aggregation circuit 134 may be structured to cluster, via the KMC process, the consumer activity patterns into representative patterns. In some embodiments, the common characteristics are clustered by collecting individual types of characteristics that are consistent among the consumers showing adverse account events over the relevant time period. In this regard, individual characteristics and consumer activity patterns may be clustered into various consumer groups.

In further embodiments, an intelligent electronic communication comprising one or more ranked product recommendations is generated at 208. The one or more ranked product recommendations may be based, at least in part, on at least one of the adverse account event (e.g., the adverse account event such as a $500 overdraft) or the consumer group (e.g., the variable payer group) as described above with reference to FIG. 1. Accordingly, the recommendation engine 120 may be structured to determine one or more products (e.g., a line of credit, deposit account, a secondary consumer account, etc.) associated with the consumer account. To that end, the recommendation engine 120 may be structured to determine at least one of one or more unutilized product recommendations or one or more utilized product recommendations. For example, the recommendation engine 120 may be structured to determine a utilized product (e.g., a secondary deposit account associated with a consumer account). In some example embodiments, the recommendation engine 120 may determine an unutilized product recommendation (e.g., a recommendation to transfer $3000 from the secondary deposit account) based on the utilized product (e.g., the secondary deposit account) and the adverse account event (e.g., a $500 overdraft).

In further embodiments, the one or more ranked product recommendations may include one or more products (e.g. one or more unutilized products, utilized products, or both) associated with a plurality of consumer accounts corresponding to the consumer group. Accordingly, the recommendation engine 120 may be structured to determine one or more products corresponding to the consumer group. In this regard, the recommendation engine 120 may be structured to determine at least one of one or more unutilized product recommendations or one or more utilized product recommendations based on the one or more products corresponding to the consumer group. For example, the recommendation engine 120 may determine one or more unutilized product recommendations, such as the unutilized product recommendation "A" (e.g., a recommendation to transfer $1000 from the line of credit), "B" (a recommendation to transfer $1000 from an investment portfolio), and "C" (a recommendation to transfer $1000 from a brokerage account) based on one or more products corresponding to the consumer group (e.g., one or more products utilized by consumers indicated by clustered consumer activity patterns of like consumers). As will be appreciated by one of ordinary skill in the art, the one or more product recommendations may comprise different options in terms of the source account for the funds transfer, the amount of funds to transfer, when to transfer the funds, etc. Further description of the generation of an intelligent electronic communication comprising one or more ranked product recommendations is provided herein below with reference to FIG. 5.

In some embodiments, the recommendation engine 120 may be structured to determine whether to provide the intelligent electronic communication to the consumer via the consumer device 104 at 210. The intelligent electronic communications may be provided to the consumer device 104 according to the consumer preference criteria associated with the consumer account as described herein with reference to FIG. 1. Alternatively or additionally, the delivery circuit 138 may be structured to determine whether to provide the intelligent electronic communication to the consumer according to the consumer group (e.g., the cohort sharing common characteristics of consumer activity) correlated to the consumer account.

In some embodiments, the recommendation engine 120 may be structured to cause the intelligent electronic communication to be distributed to a consumer device 104 (e.g., a mobile phone, wearable, etc.) according to an intelligent delivery mode (e.g., at least one of a delivery location, delivery period, or an electronic communication type) at 212. To that end, the consumer device 104 may be configured to correspond to, or otherwise communicate with or access, the consumer account. For example, the consumer device 104 may be operable to interface with the financial institution computing system 118 via a mobile application (e.g., mobile app), a web site designed to provide consumer access, etc. In further embodiments, the consumer device 104 may be structured to indicate, via the network interface 126, the intelligent electronic communication (e.g., a text message or alert comprising one or more ranked product recommendations) to a consumer (e.g., the consumer associated with the consumer account). The indication of the intelligent electronic communication may be output, for example via a display (e.g., an input/output device), for communicating the intelligent electronic communication to the consumer.

Figure 3:
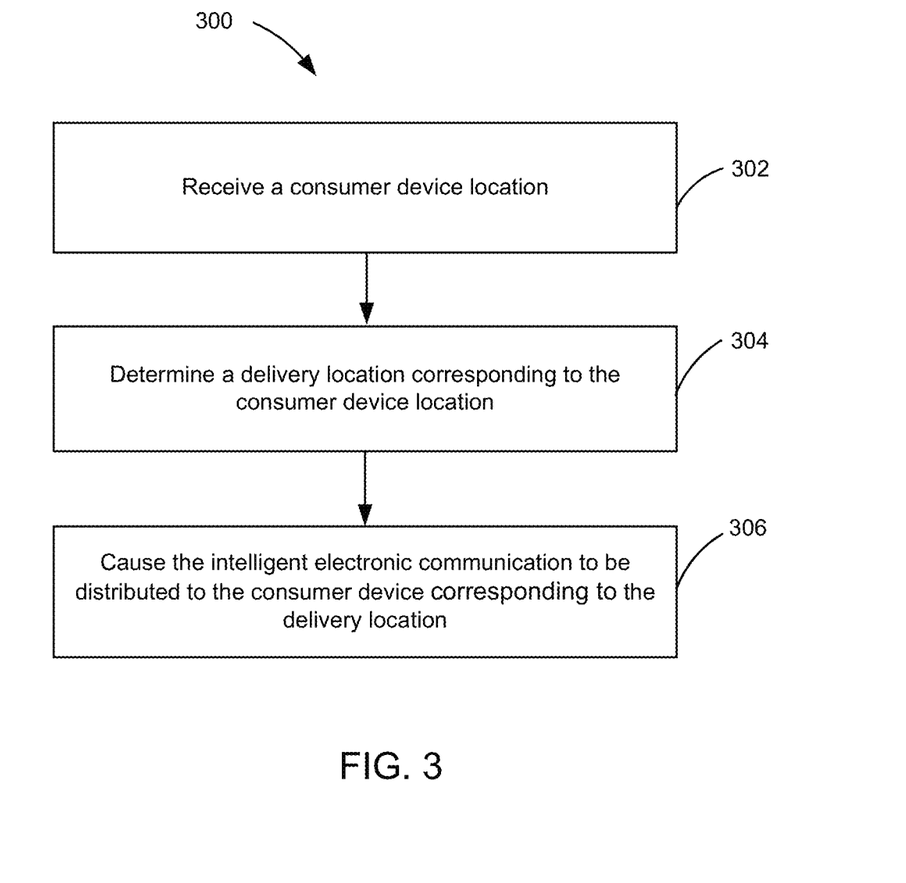
FIG. 3 is a flow diagram of a method of causing an intelligent electronic communication to be distributed to a consumer device according to an example embodiment.

With respect to FIG. 3, a flow diagram of a method 300 of causing an intelligent electronic communication to be distributed to a consumer device according to a delivery location is shown according to an example embodiment. Method 300 may be performed by the recommendation engine 120. The method 300 begins when a consumer device location is received at 302. The consumer device location may be received responsive to the delivery circuit 138 having determined whether to provide the intelligent electronic communication to the consumer as described herein with reference to FIGS. 1 and 2. Accordingly, the consumer device location (e.g., the position or location corresponding to an area or venue) of consumer device 104 may be received by locator 106 as described herein with reference to FIG. 1.

In response, the recommendation engine 120 may determine a delivery location corresponding to the consumer device location at 304. The delivery location may be determined even if the transactions corresponding to the consumer account (e.g., the consumer account associated with the consumer to receive the intelligent electronic communication) does not indicate, or otherwise include, a consumer device location associated with a delivery location. For example, the delivery location may be determined based on cohort analysis (as described above) regarding other similarly-situated consumers and transactions associated with the other similarly-situated consumers.

In further embodiments, the recommendation engine 120 may cause the intelligent electronic communication to be distributed to the consumer device corresponding to the delivery location at 306. Alternatively or additionally, the recommendation engine 120 may be structured to prevent the intelligent electronic communication from distribution to a consumer device corresponding to the delivery location.

Accordingly, the recommendation engine 120 may prevent the intelligent electronic communication from distribution to a consumer device at any consumer device location by which the recommendation engine 120 determines a reduced or lack of consumer activity corresponding to a consumer group in response to receipt of intelligent electronic communications at the consumer device location.

Figure 4:
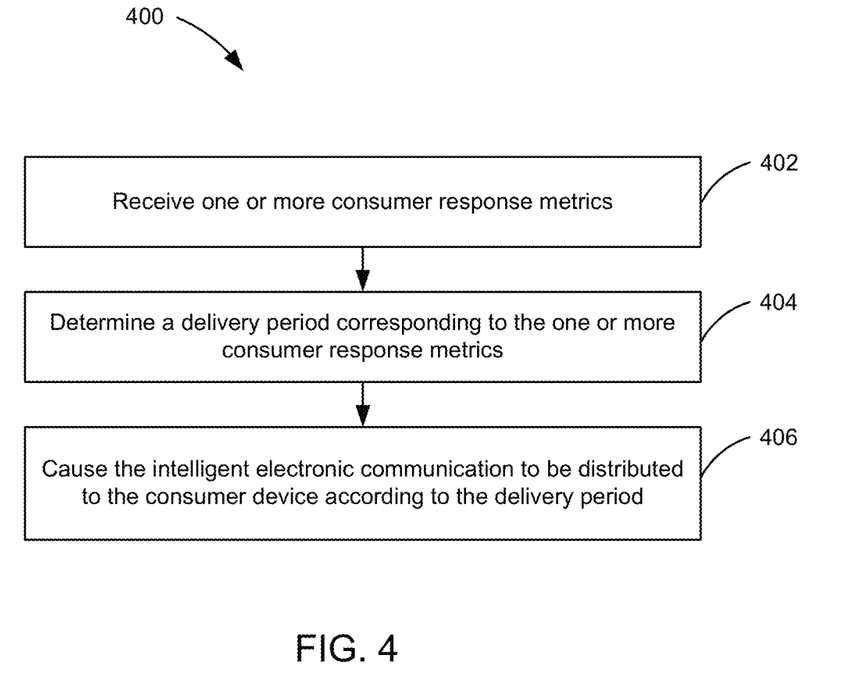
FIG. 4 is a flow diagram of a method of causing an intelligent electronic communication to be distributed to a consumer device according to an example embodiment.

With respect to FIG. 4, a flow diagram of a method 400 of causing an intelligent electronic communication to be distributed to a consumer device according to a delivery period is shown according to an example embodiment. Method 400 may be performed by the recommendation engine 120. The method 400 begins when one or more consumer response metrics are received at 402. The consumer response metrics (e.g., metrics corresponding to response time or period based on a plurality of consumer accounts associated with a consumer group) may be received responsive to the delivery circuit 138 having determined whether to provide the intelligent electronic communication to the consumer as described herein with reference to FIGS. 1 and 2.

In some embodiments, the recommendation engine 120 may determine a delivery period corresponding to the one or more consumer response metrics at 404 The one or more consumer response metrics may be derived from one or more time identifiers (e.g., one or more clocks) associated with the financial institution computing system 118 and/or the consumer device 104. In some embodiments, the consumer response metrics may be aggregated to generate common characteristics of consumer activity such as data associated with time responsive to the receipt of an intelligent electronic communication. The common characteristics of consumer activity may be clustered into consumer activity patterns via the KMC process. In further embodiments, the consumer activity patterns may be combined with the consumer response metrics to determine the delivery period.

For example, the recommendation engine 120 may determine that other consumers corresponding to the consumer group respond to intelligent electronic communications received at a delivery period, or otherwise within a delivery range. As will be appreciated by one of ordinary skill in the art, the delivery period may be determined even if the transactions corresponding to the consumer account (e.g., the consumer account of the consumer to receive the intelligent electronic communication) does not indicate, or otherwise include, a consumer response metric associated with the delivery period.

In further embodiments, the recommendation engine 120 may cause the intelligent electronic communication to be distributed to the consumer device according to the delivery period at 406. Alternatively or additionally, the recommendation engine 120 may be structured to prevent the intelligent electronic communication from distribution to a consumer device according to the delivery period. For example, if a consumer account includes a profile comprising consumer preference criteria (e.g., data indicative of a preferred time that a consumer prefers to receive intelligent electronic communications), the recommendation engine 120 may prevent the intelligent electronic communication from distribution to the consumer device during the period of time outside of the preferred time indicated by the consumer preference criteria.

Figure 5:
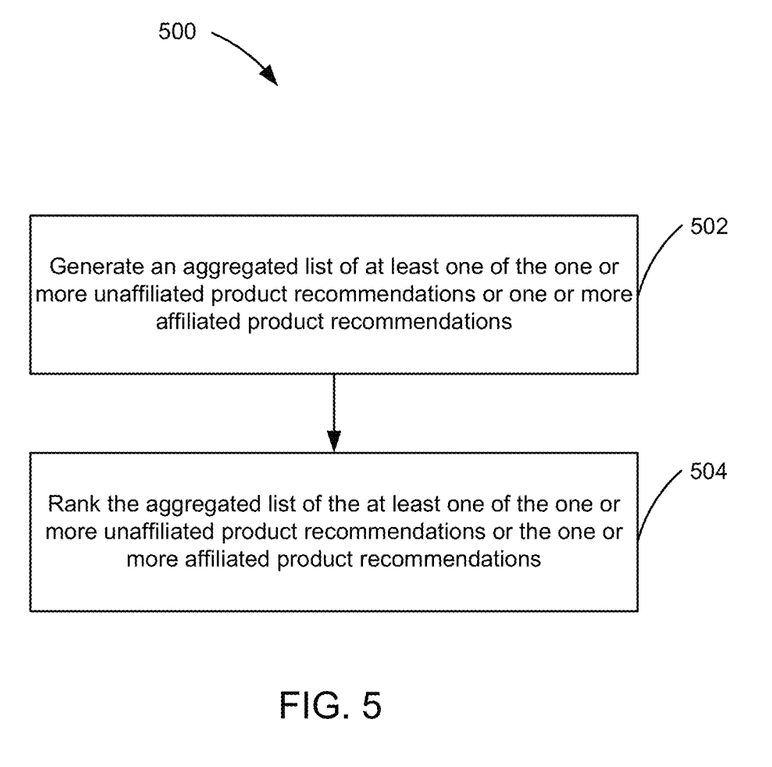
FIG. 5 is a flow diagram of a method of generating an intelligent electronic communication comprising one or more ranked product recommendations according to an example embodiment.

With respect to FIG. 5, a flow diagram of a method 500 of generating an intelligent electronic communication comprising one or more ranked product recommendations is shown according to an example embodiment. Method 500 may be performed by the recommendation engine 120. The method 500 begins when an aggregated list of at least one of the one or more unutilized product recommendations or one or more utilized product recommendations is generated at 502. The one or more ranked product recommendations may be based, at least in part, on at least one of the adverse account event In some embodiments, the aggregated list may be a function of the adverse account event, consumer group, etc. For example, an aggregated list of product recommendations may be defined by the aggregation of common characteristics of consumer activity such as products utilized by like consumer responsive to an adverse account event. The common characteristics of consumer activity may be clustered into consumer activity patterns via the KMC process; The product recommendations may include "Option A, Option B, Option C, etc." Accordingly, the aggregated list may include common characteristics of consumer activity structured to indicate that 70% of consumers chose option A (e.g., the recommendation to transfer $1000 from the line of credit), 10% of consumers chose option B (e.g., the recommendation to transfer $1000 from an investment portfolio), and 20% of consumers chose option C (e.g., a recommendation to transfer $1000 from a brokerage account) in response to an adverse account event (e.g., an adverse account event such as an overdraft, a missed credit card payment, etc.).

In further embodiments, the aggregated list of the one or more product recommendations is ranked at 504. The intelligent electronic communication comprising the one or more ranked product recommendations may be structured to provide an indication of consumer activity corresponding to the consumer group. To that end, the intelligent electronic communication may provide the consumer with an aggregated list comprising at least one of one or more unutilized product recommendations or one or more utilized product recommendations to resolve, or otherwise address, the adverse account event (e.g., the overdraft). The aggregated lists may then be ranked by the recommendation engine 120, such as, for example, to determine the products on the list comprising a higher use rate (e.g., demand) when compared to other products on the list. In this regard, the recommendation engine 120 may generate the ranked product recommendation comprising at least one of the one or more unutilized product recommendations or the one or more utilized product recommendations. The ranked product recommendation may include a list of relationships as between one or more product recommendations such that, for any two product recommendations, one product recommendation is ranked higher than the other, lower than the other, equal to the other, etc. Further, the ranked product recommendation may provide an example ordering by which consumer activity may be gauged.

In some examples, a ranked product recommendation may include assigned product scores. A product score may include a score assigned to one or more product recommendations (e.g., one or more unutilized product recommendations, one or more utilized product recommendations, etc.) based on consumer activity, product availability, etc. Referring to the overdraft example above, consumer activity "Option A" may be utilized by 700 consumers including an assignment of "1" to each consumer activity yielding a product score of 700. Consumer activity "Option B" may be utilized by 100 consumers including an assignment of "1" to each consumer activity yielding a product score of 100. Consumer activity "Option C" may be utilized by 200 consumers including an assignment of "2" to each consumer activity yielding a product score of 200. Accordingly, the "Option B" with a product score of 100 may be ranked lower than "Option A and Option C" with the product scores of 700 and 200 respectively on the ranked product recommendation.

In this regard, the intelligent electronic communication may further include an indication of how other consumers have utilized the one or more product recommendations to respond to the adverse account event. For example, the intelligent electronic communication may include a message to a consumer such as "Other like consumers who received an intelligent electronic communication corresponding to the adverse account event chose the following options:, 70% chose option A, 20% chose option C, and 10% chose option B". The one or more product recommendations may comprise different recommendations (e.g., options) with respect to the source account for the funds transfer, the amount of funds to transfer, when to transfer the funds, etc.

In some embodiments, the one or more ranked lists may be associated with various consumer identifiers (e.g., a consumer name, consumer account number(s), consumer e-mail address, consumer device number, etc.).

In further embodiments, the recommendation engine 120 may be structured to monitor the consumer accounts for subsequent consumer activity (e.g., subsequent adverse account events, transactions, account openings, account closings, new balances, and any other account information that may change the consumer group and/or product recommendations corresponding to the consumer account).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for providing an intelligent electronic communication to a consumer device, the method comprising:
   accessing consumer data regarding a consumer account;
   determining an adverse account event regarding the consumer account based on the consumer data, wherein the adverse account event relates to a missed payment associated with the consumer account;
   based on determining the adverse account event, generating, by a clustering process, a consumer group defined by a common characteristic of consumer activity;
   correlating the consumer account to the consumer group based, at least in part, on the consumer data corresponding to the consumer group;
   generating the intelligent electronic communication comprising one or more ranked product recommendations that are specific to the adverse account event and based, at least in part, on the adverse account event and the consumer group, the one or more ranked product recommendations configured to include one or more unutilized product recommendations;
   determining an intelligent delivery mode, a delivery period, and a delivery location to provide the intelligent electronic communication to the consumer device, wherein the delivery location is determined based on an association between a current location of the consumer device and historical response data associated with consumers in the consumer group at the delivery location; and
   causing the intelligent electronic communication to be distributed to the consumer device in accordance with the intelligent delivery mode, the delivery period, and the delivery location.

2. The method of claim 1, wherein the intelligent delivery mode comprises an electronic communication type.

3. The method of claim 1, wherein the method further comprises determining the delivery period by determining that consumers in the consumer group are responsive to an electronic communication provided during the determined delivery period based on one or more consumer response metrics associated with the consumer group, and wherein causing the intelligent electronic communication to be distributed is further during the delivery period.

4. The method of claim 1, wherein generating the intelligent electronic communication further comprises:
   determining one or more products corresponding to the consumer account; and
   determining at least one of the one or more unutilized product recommendations or one or more utilized product recommendations based on the one or more products corresponding to the consumer account.

5. The method of claim 1, wherein generating the intelligent electronic communication further comprises:
   determining one or more products corresponding to the consumer group; and
   determining at least one of the one or more unutilized product recommendations or one or more utilized product recommendations based on the one or more products corresponding to the consumer group.

6. The method of claim 1, wherein generating the intelligent electronic communication further comprises:
   generating an aggregated list of at least one of the one or more unutilized product recommendations or one or more utilized product recommendations; and
   ranking the at least one of the one or more unutilized product recommendations or the one or more utilized product recommendations of the aggregated list, wherein the intelligent electronic communication comprising the one or more ranked product recommendations is configured to provide an indication of consumer activity corresponding to the consumer group.

7. The method of claim 1, wherein the clustering process is a k-means clustering (KMC) process.

8. The method of claim 1, wherein the intelligent delivery mode includes the delivery location and the method further comprises:
   causing the intelligent electronic communication to be distributed to the consumer device according to the delivery location, wherein the delivery location corresponds to at least one of the consumer data corresponding to the consumer account or the consumer data corresponding to the consumer group.

9. The method of claim 1, wherein the consumer data comprises at least one of a consumer account balance, consumer asset data, consumer liability data, or a consumer financial pattern.

10. The method of claim 1, wherein the consumer data comprises a data set comprising an aggregated population of data associated with at least a portion of the consumer group.

11. A computer system configured to provide an intelligent electronic communication to a consumer device, the computer system comprising:
a network interface structured to facilitate data communication with the consumer device via a network;
a memory; and
a processor coupled to the memory, the processor structured to:
access consumer data regarding a consumer account;
determine an adverse account event regarding the consumer account based on the consumer data, wherein the adverse account event relates to a missed payment associated with the consumer account;
based on determining the adverse account event, generate, by a clustering process, a consumer group defined by a common characteristic of consumer activity;
correlate the consumer account to the consumer group based, at least in part, on the consumer data corresponding to the consumer group;
generate the intelligent electronic communication comprising one or more ranked product recommendations that are specific to the adverse account event based, at least in part, on the adverse account event and the consumer group, the one or more ranked product recommendations including one or more unutilized product recommendations;
determine an intelligent delivery mode, a delivery period, and a delivery location to provide the intelligent electronic communication to the consumer device, wherein the delivery location is determined based on an association between a current location of the consumer device and historical response data associated with consumers in the consumer group at the delivery location; and
cause the intelligent electronic communication to be distributed to the consumer device in accordance with the intelligent delivery mode, the delivery period, and the delivery location.

12. The computer of claim 11, wherein the intelligent delivery mode comprises an electronic communication type.

13. The computer of claim 11, wherein the processor is further structured to determine the delivery period by determining that consumers in the consumer group are responsive to an electronic communication provided during the determined delivery period based on one or more consumer response metrics associated with the consumer group, and wherein the processor is further structured to cause the intelligent electronic communication to be distributed during the delivery period.

14. The computer of claim 11, wherein the processor is structured to generate the intelligent electronic communication by:
determining one or more products corresponding to the consumer account; and
determining at least one of the one or more unutilized product recommendations or one or more utilized product recommendations based on the one or more products corresponding to the consumer account.

15. The computer of claim 11, wherein the processor is structured to generate the intelligent electronic communication by:
determining one or more products corresponding to the consumer group; and
determining at least one of the one or more unutilized product recommendations or one or more utilized product recommendations based on the one or more products corresponding to the consumer group.

16. The computer of claim 11, wherein the processor is structured to generate the intelligent electronic communication by:
generating an aggregated list of at least one of the one or more unutilized product recommendations or one or more utilized product recommendations; and
ranking the at least one of the one or more unutilized product recommendations or the one or more utilized product recommendations of the aggregated list, wherein the intelligent electronic communication comprising the one or more ranked product recommendations is configured to provide an indication of consumer activity corresponding to the consumer group.

17. The computer of claim 11, wherein the clustering process is a k-means clustering (KMC) process.

18. The computer of claim 11, wherein the intelligent delivery mode includes the delivery location, and the processor is further structured to:
causing the intelligent electronic communication to be distributed to the consumer device according to the delivery location, wherein the delivery location corresponds to at least one of the consumer data corresponding to the consumer account or the consumer data corresponding to the consumer group.

19. The computer of claim 11, wherein the consumer data comprises at least one of a consumer account balance, consumer asset data, consumer liability data, or consumer financial pattern.

20. A non-transitory computer readable storage medium storing instructions that, when executed by a processor, cause the processor to perform operations comprising:
accessing consumer data regarding a consumer account;
determining an adverse account event regarding the consumer account based on the consumer data, wherein the adverse account event relates to a missed payment associated with the consumer account;
based on determining the adverse account event, generating, by a clustering process, a consumer group defined by a common characteristic of consumer activity;
correlating the consumer account to the consumer group based, at least in part, on the consumer data corresponding to the consumer group;
generating an intelligent electronic communication comprising one or more ranked product recommendations that are specific to the adverse account event based, at least in part, on the adverse account event and the consumer group, the one or more ranked product recommendations configured to include one or more unutilized product recommendations;
determining an intelligent delivery mode, a delivery period, and a delivery location to provide the intelligent electronic communication to a consumer device, wherein the delivery location is determined based on an association between a current location of the consumer device and historical response data associated with consumers in the consumer group at the delivery location; and
causing the intelligent electronic communication to be distributed to the consumer device in accordance with the determined intelligent delivery mode, and the at least one of the delivery period, and the delivery location.

\* \* \* \* \*